United States Patent [19]

Nowak

[11] 3,844,641
[45] Oct. 29, 1974

[54] DEVICE FOR DIAGNOSING AND CORRECTING EYE FUSION

[76] Inventor: Chester J. Nowak, 8150 Milwaukee Ave., Niles, Ill. 60648

[22] Filed: Aug. 23, 1973

[21] Appl. No.: 390,731

[52] U.S. Cl. .................... 351/33, 128/2 T, 351/36, 351/39, 351/3
[51] Int. Cl. ........................................... A61b 3/08
[58] Field of Search .......... 351/1, 3, 33, 35, 36, 39; 128/2 T

[56] References Cited
OTHER PUBLICATIONS

The Optometric Weekly, Vol. 56, No. 4, Oct. 7, 1965, p. 22–24 "Foreal Dstrophy."

*Primary Examiner*—Paul A. Sacher
*Attorney, Agent, or Firm*—Root & O'Keeffe

[57] ABSTRACT

Apparatus for diagnosing and correcting eye fusion, i.e., making both eyes of a person work as one, and detecting when one eye is suppressed or when eyes work alternately. The apparatus consists of two charts, both having a background of the same color and shade intensity, and indicia thereon also of the same color, but of a different shade intensity from that of the common area. The indicia on one chart may be identical with or complementary to the indicia on the other chart. The charts are placed in side-by-side relation, and viewed either through a prism, reflecting mirrors, or a telebinocular instrument so adjusted that the two charts will be fused together, (forming a Cycloptic chart) and if the viewer sees, in the fused charts, all of the indicia on both charts, then he is binocular. If the indicia of one or the other charts is not seen, or if disappearing of the indicia occurs, then one eye is being suppressed, and the charts may be used not only to detect this condition, but also to correct it, thereby improving reading problems, by correcting eye fusion in a field within an angle of approximately 30° to the right and left, as well as within the central field of vision.

12 Claims, 3 Drawing Figures

PATENTED OCT 29 1974  3,844,641
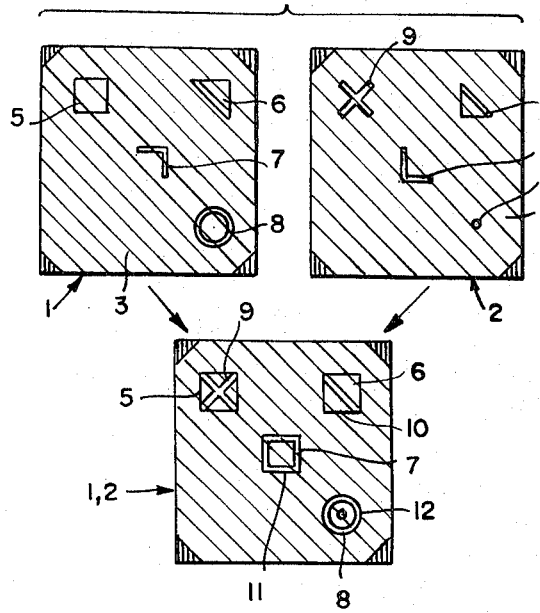
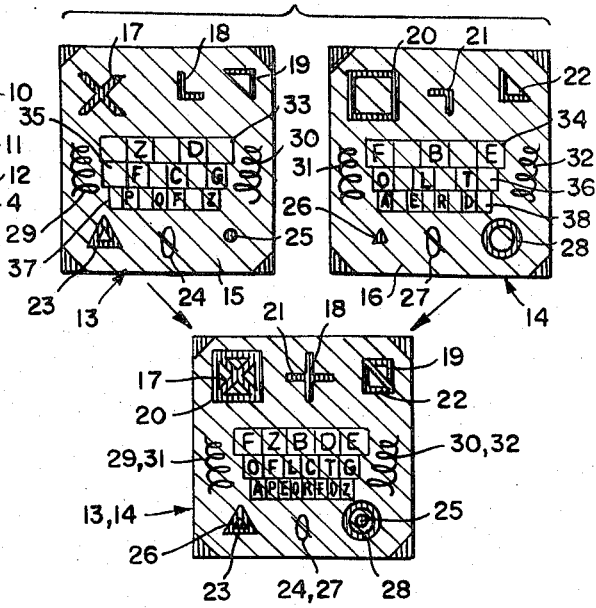
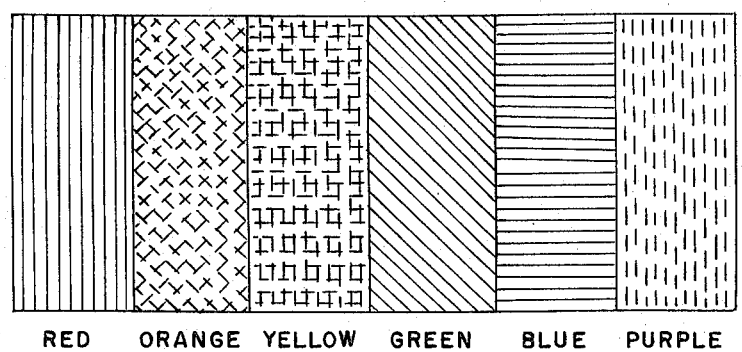

DEVICE FOR DIAGNOSING AND CORRECTING EYE FUSION

BRIEF SUMMARY OF THE INVENTION

The invention relates to apparatus for diagnosing and correcting eye fusion, that is, the ability of a person to use both eyes as one. It is customary to test eyes to determine their relative strength, and this can be corrected by the use of proper lenses in spectacles, but it has been more difficult, if not impossible, to detect the tendency of a person, for example, to suppress the use of one or the other of his eyes. This is particularly true in children who have difficulty in reading. To avoid over-correcting one eye, and by checking with the fusional charts, a doctor can balance the power of the corrective lenses prescription between right and left eyes and thereby overcome a false suppression response.

The present invention is designed to not only detect eye suppression, but also to correct it. For this purpose, two charts are provided with the same color background and common ground. On each chart, there are indicia of any suitable character, preferably of the same color as the background color, but of a different shade intensity than the background. These charts may be mounted in side-by-side relation for viewing by the patient. The charts may be large enough for mounting on a wall, in which case the patient will view them through a variable prism of suitable angularity, which may be turned until three charts will be seen, one on the right, one on the left, and a center one which will be a combination of the two charts, fused together, or cycloptic chart.

If the patient sees only the indicia of one chart, by looking at the fused chart with both eyes, then he is not using both eyes, but only one, thereby indicating that suppression exists in one eye. By closing one eye, then the other, one can determine which is the suppressed eye.

Once it is determined that there is eye suppression, the charts may then be used to correct the condition and achieve binocularity for the patient. This is done by having the patient use the charts and prism at home, looking through the prism with both eyes. When the indicia on one chart disappears, the patient will stop momentarily, perhaps blinking, then resume looking hard at the fused charts. Continuing such treatment several times daily will eventually train the patient's eyes to work together and achieve binocularity in the central field of vision.

Another valuable eye correction can be obtained from the fusional charts by correcting eye fusion in the field of vision within an angle of approximately 30° to the right and left. It is based upon the same principle as for the central field, but with the head turned to the right or left, or positioning the charts to the patients' right or left side. The eye coordination (binocularity) for reading is greatly improved, and thereby reading speed and comfort is increased, as well as word understanding.

Another form of the invention may be provided by making the charts small enough to mount in a telebinocular instrument and viewing them through such instrument rather than a prism, but the diagnosis and treatment will be the same. The basic charts can also be printed on film and projected onto a screen, or a mirror can be used to produce a cycloptic chart by reflection of the two main charts.

DESCRIPTION OF THE DRAWING

FIG. 1 is an elevational view, illustrating the two charts having complementary indicia thereon and a third chart which represents the appearance of the fused or Cycloptic charts, as they will be seen by a person with binocularity.

FIG. 2 is also an elevational view of two charts with different indicia thereon, and which includes an illustration of the fused chart that will be seen by a person having binocularity, and FIG. 3 is a color spectrum and is for the purpose of illustrating which colors can be used and which colors should not be used for the background area and for the various indicia on the charts.

DETAILED DESCRIPTION

As indicated above, the fusional charts may be used to detect or to diagnose eye suppression. The charts also are to be used to correct eye suppression, once it has been diagnosed, and to achieve binocularity in the patient.

It should be stated, at the outset, that the background area of each chart should be of the same color and shade intensity, while the indicia thereon should be of the same color, but of a different shade intensity. This combination gives the best results, although that is not to say that different colors cannot be used for the background area and the indicia, provided they are of sufficiently close wave length so as not to create what is known as "retinal rivalry," which behaves like eye suppression, thus making it impossible to determine whether it is retinal rivalry or suppression which is taking place.

For example, if the common ground of the charts were to be white, and the indicia were to be black, one eye would want to see one color, and the other might want to see the other color, and, therefore, because of this retinal rivalry, the viewer would not see a true composite chart.

Referring now, more particularly, to the drawing and to enable a better understanding of the invention, FIG. 1 illustrates a first chart, indicated by the numeral 1, and a second chart indicated by the numeral 2. These charts, whether to be used for diagnostic purposes, or for treatment, are to be placed on a support, preferably about 8 to 12 feet away from the patient and about 8 inches apart at eye level, and well illuminated. For purposes of illustration, the chart 1 has been shown as having a light green background 3. The background of the chart 2 is the same color and is indicated by the numeral 4. The common areas of charts 1 and 2 are the four corners, which are known as "common ground" because the darker intensity green is the same shape on both charts. It will be noted on chart 1, that there are several indicia, and that they are complementary to the indicia shown on chart 2. For example, in the upper left-hand corner of chart 1, there is placed the outline of a square 5. In the upper right-hand corner, there is the outline of a triangle 6. In the center, there is illustrated a right angled figure in the shape of an inverted "L" as indicated by the numeral 7. In the lower right-hand corner, there is the outline of a circle, as shown at 8. Each of these indicia, preferably, is of the same color as the background area 3, but of a different shade intensity. For example, the background might be a light green, and the indicia a dark green.

In the companion chart, indicated at 2, there is shown in the upper left-hand corner an "X," as indicated by the numeral 9. In the upper right-hand corner, there is shown the outline of a triangle 10, but it is positioned opposite to the triangle 6 on the chart 1. In the center, there is an L-shaped figure, and in the lower right-hand corner, there is a relatively small dot. The center figure is indicated by the numeral 11, and the dot by the numeral 12.

Again, the background 4 of the chart 2 is preferably of the same shade intensity and color, as the background 3 of the chart 1. In this case, it would be a light green, whereas indicia on chart 2 are preferably a darker green and of the same shade intensity and color as the indicia on chart 1.

In using these charts to detect or diagnose eye suppression or good eye fusion, the charts 1 and 2 should be suitably mounted, perhaps on a wall, approximately 8 to 12 feet from the patient or viewer, and about 8 inches apart. They should be fairly illuminated, preferably to about a minimum of 10-foot candle power.

These charts are then to be viewed through a variable prism. At that time, the viewer will see four charts, two to the right, and two to the left. When the charts are thus being viewed, for example, with the number 7 finding in the doctor's phoropter, and then turned to approximately 15° prism base-in, or about 25 degrees prism base-out, when the viewer or doctor reduces the prism base-in to about 8 degrees, it should produce three images of the charts, one to the left, one to the right, and one in the center, which will be the composite of the other two images, or the Cycloptic chart.

If the viewer or patient has binocular vision or good eye fusion, he will see the composite of the charts, as illustrated in FIG. 1. In this instance, the "X" will appear within the square 5, the triangles 6 and 10 will be brought together to form a square with a diagonal line therein; the two right angled lines 7 and 11 will combine to form a square, and the dot 12 will appear within the circle 8. The doctor, himself, may look through the prism, and close the right eye, and then the left eye, and he can see which of the indicia belong to the left eye and which belong to the right eye. If the patient does not see all of the indicia on both charts in the composite, it is an indication that one or the other eye is being suppressed, depending upon which set of indicia he sees. The indicia that the patient is seeing shows the dominate eye, and those which he does not see show the suppressed eye. If the patient sees one indicia from one eye, and then the other, it could indicate an alternating pattern.

As mentioned, heretofore, these charts, 1 and 2, can be made large enough to be mounted on the wall, or small enough to mount in a telebinocular or reflective mirror instrument, or projected from film. When mounted on the wall, or projected, the patient views them through a variable prism, but when mounted within the instrument, he views them through such instrument, rather than a prism, but in all such cases, the diagnosis and treatment will be the same.

As has also been mentioned hereto fore, the proper colors and shade intensity of the background area in the charts and of the indicia, should be such as to minimize any retinal rivalry. Preferably, the background of both charts should be of the same color, and indicia thereon should also be the same color in both charts, but should be of a different shade intensity than the background area. By way of example, in FIG. 1, the background areas of the charts are shown as a relatively light green, whereas the indicia thereon are also green but of a darker shade, thereby reducing retinal rivalry to a minimum, otherwise a false diagnosis of a lack of binocular fusion would be produced.

Other colors could also be used, which are present in the color spectrum, from red through purple, and all of the different shade intensities thereof. The different shades will, of course, have different wave lengths, and it is preferred that the difference in wave lengths between the background area and the indicia, be not greater than approximately 25 angstrom units; otherwise, the retinal rivalry will be so great that only one or the other of the charts would be seen, even by a person having good eye fusion.

It might be possible, therefore, to have specifically different colors, for example, one end of the red, and the adjacent end of the orange colors in the spectrum might be used, where the color red is approaching the orange, and where the color orange is approaching the red. In view of this fact, the claims herein are intended to cover this type of situation where they include reference to the indicia on the charts, as being of the same color as the background area, but of a different shade intensity.

It will be evident, of course, that other figures or indicia could be used than those illustrated in the drawing. As will be pointed out hereinafter, the indicia of the two charts need not, necessarily, be complementary, as in charts 1 and 2, since they could also be identical on the two charts, so that when merged together in the composite, the two indicia would appear as one. These identical indicia are referred to herein as "common ground," and in charts 1 and 2 this common ground is shown as being the four corners. Likewise, there could be some indicia which the complementary, and others that are identical, on the same charts. Also, as will become evident hereinafter, letters can be used, and the letters can vary in size for the purpose of indicating stereoscopic acuity. If a child's eyes are being tested, he may not be able to read the letters, and, therefore, other types of indicia can be used, as above indicated, by having the charts show geometric figures which are familiar to the child.

If it is determined that the patient normally suppresses one or the other eye, indicating that both eyes are not being used, then the patient must undergo visual training to learn to use both eyes, at the same time, and these charts, as above described, and those to be described hereinafter, can also be used to correct eye fusion. By using the same charts, as a diagnostic procedure, as well as a training or corrective procedure, it is more easily understood by the child or by the adult. Such corrective procedure may take place in the home, where the patient is furnished with the charts and the variable prism. Cases of high strabismus and great degrees of amblyopia will not see the four images with the prism base-in. They are one eye persons. In cases of such severity, the doctor may stimulate the fundus by pleoptic training. If the awareness of the two eyes can be developed, then fusion to the finest degree can be established. It has been found that, in some cases, where children have this problem, some, signs of fusion can be produced by allowing the child to come within three feet of the chart, and, then, by allowing the child to take home the charts and prism, a greater degree of fusion awareness can be established, and finally, the monocular problem can be corrected.

The treatment of the patient, and the training of binocularity will start when the markings or indicia on the composite image are observed. Some of these will belong to the right eye, and others to the left eye. The object of the training is to see all of the indicia on both charts, together, from both eyes. One or the other group of indicia may disappear, after a short peroid of time, and these would be those seen by the suppressed eye. The training begins when the patient sees all of the indicia on both charts, and then begins to count to himself. If either group of indicia should disappear, the patient must stop counting. Blinking the eyes, and opening them wide, and looking hard, brings about the use of both eyes together. It is recommended that the patient first look at the common ground or fused identical indicia on the composite chart, then look up at the target consisting of the remaining indicia. This helps to orient the eyes and obtains better and more accurate results. The object is to train both eyes to work together, so that the indicia will not disappear during the counting sequence up to 500. At this time, the patient will have achieved good eye fusion. It is recommended that this training procedure be carried out in 10-minute periods, with a minimum of four periods a day, until the 500 count can be reached.

Referring, now, to FIG. 2, the two charts 13 and 14 are illustrated, which, again, are shown as having a background area which is green. The background area of chart 13 is indicated at 15, while the background area of the chart 14 is indicated at 16.

The chart 13 is illustrated, as containing at the top thereof a large "X" 17, a right angled "L" 18, and a triangle 19. The chart 14 has complementary figures, consisting of a square 20, an inverted right angled "L" 21, and a triangle 22.

When these charts are viewed through a prism, as above indicated, by a person having binocularity, the composite will be as illustrated in the merged chart, at the bottom of FIG. 2, where the "X" is within the square; the upright and inverted L-shaped figures form a cross, and the two triangles will be brought together to form a square.

In the lower left-hand corner of chart 13, there is illustrated a triangle 23. In the center, there appears an oval 24, with a diagonal line passing therethrough, and in the lower righ-hand corner is a dot 25. In the chart 14, in the lower left-hand corner, there is a small triangle 26, which is complementary to the triangle 23 on chart 13. In the center is an oval 27 with a diagonal line therethrough, which is identical with the indicia 24. In the lower right-hand corner, there appears a circle 28, which is complementary to the dot 25.

When these two charts form a composite or Cycloptic picture by viewing through the prism, or telebinocular or reflective mirror instrument, the small triangle 26 will be seen within the large triangle 23; the dot 25 will appear within the circle 28, and the two designs 24 and 27 will appear as one. Since these latter two designs are identical they are the common ground.

Further, by way of illustration, the chart 13 has illustrated therein, at the left side, a special form of design 29, and the reverse of this design is shown at the right side of the chart by the numeral 30. The chart 14 has a design 31 on the left thereof, identical with the design 29, while at the right side thereof, the design 32 is identical with that indicated at 30, on chart 13. These designs, or common ground areas, will be brought together and appear as one on each side of the composite or cycloptic chart, as shown in the lower part of FIG. 2.

The charts 13 and 14 have also been provided with indicia for the purpose of indicating steroscopic acuity, i.e. vision acuity that indicates not only the degree (20/40, 20/30, 20/20 line) but also which eye is being used — the right, the left, the two eyes together, or alternating.

Steroscopic acuity is directly proportional to depth perception. When a person can read 20/20 steroscopic acuity letters, then his depth perception is normal.

In the charts 13 and 14, there are provided three lines of alternating letters and blank spaces. In chart 13, the upper line is indicated at 33, and the common ground line in chart 14 is indicated at 34. This is the 20/40 vision line. Both lines have a plurality of spaces, some of which are blank and some of which contain letters. The letters on one chart are so located that when the two charts form a cycloptic picture, those letters will appear in the blank spaces of the other chart.

The second line of alternating spaces and letters in chart 13 is indicated at 35, and the comparable line in chart 14 is indicated at 36. This is the 20/30 vision line. These lines function in the same way as the top line, and the letters in the line on one chart will appear in the blank spaces of the same line on the other chart, when the two images are brought together to form the composite.

The bottom line of alternating letters and blank spaces on chart 13 is indicated at 37, and the comparable line on chart 14 is indicated at 38. This is the 20/20 vision line.

Thus, when the charts 13 and 14, having this type of indicia thereon are viewed, either through a variable prism, mirror reflection, or a telebinocular instrument, so that the composite of the two charts is formed, these lines 33 and 34, line 35 and 36 and line 37 and 38 are used to determine stereoscopic acuity. As mentioned above, when a patient can read the 20/20 stereoscipic acuity letters, as they appear in the composite of the lines 37 and 38, his depth perception is normal. The remaining indicia on these charts are primarily for the benefit of children, but they also are used for determining binocularity.

It will thus be apparent from the foregoing description, that I have developed a novel device not only for diagnosing and correcting eye fusion, but also for aiding the clinician in assuring that equally clear vision is balanced between the right and left eyes by properly correcting the power of the lenses presecribed, and correcting fusion in the right and left fields of vision, thereby making reading easier; and the use of this device, and the method of diagnosing, as well as treating eye fusion has proven most satisfactory and beneficial in acutal practice.

Changes may be make in the form, construction and arrangement of parts, from those disclosed herein, without in any way departing from the spirit of the invention or sacrificing any of the attendant advantages thereof, provided, however, that such changes fall within the scope of the claims appended hereto.

When reference is made herein either in the description or claims, to a "cycloptic picture or image," it will be understood that it is a picture or image which has been formed by viewing the fusion of two charts. Thus a cycloptic picture or image presupposes that it is one seen by a viewer either (1) looking through a prism at charts mounted on a wall or projected thereon from a film, or (2) looking through a telebinocular instrument with small charts therein, or (3) looking through an instrument with reflective mirrors therein and in which small charts are mounted.

I claim:

1. Apparatus for diagnosing and correcting eye fusion, comprising
   a. a set of two charts adapted to be supported in a side-by-side relation for viewing,
   b. both of said charts having
      1. background areas of one color and
      2. indicia thereon of the same color but of different shade intensity from that of the said background areas,
   c. at least some of the indicia on one chart being
      1. complementary in form, size, and shape to the indicia on the other chart, and
      2. positioned on said charts so that when the charts are optically fused together by viewing through a variable prism of predetermined angularity by one having binocular vision, the indicia on one chart will fuse, in a complementary fashion, with the complementary indicia on the other chart and thereby produce complete indicia.

2. Apparatus as defined in claim 1, wherein each of said charts also contains common ground areas which are identical in form, size, and shape, with corresponding ones on the other of said charts and located thereon in positions relative to each other, such that, when the charts are optically fused, the corresponding common ground areas will appear as one.

3. Apparatus as defined in claim 2, wherein said common ground areas on said charts have substantially the same color and shade intensity, as said complementary indicia.

4. Apparatus for diagnosing and correcting eye fusion, comprising
   a. a set of two charts of relatively small size adapted to be mounted in a suitable instrument in side-by-side relation capable of producing a cyloptic image,
   b. both of said charts having
      1. background areas of one color, and
      2. indicia thereon of the same color but of different shade intensity from that of the said background areas,
   c. at least some of the indicia on one chart being
      1. complementary in form, size, and shape to the indicia on the other chart, and
      2. positioned on said charts so that when the charts are optically fused together by viewing through the telebinocular instrument in which they are mounted, by one having binocular vision, the indicia on one chart will fuse in a complementary fashion with the complementary indicia on the other chart and thereby produce completed indicia.

5. Apparatus as defined in claim 4, wherein each of said charts also contains common ground areas which are identical in form, size and shape with corresponding one on the other of said charts, and located thereon in positions relative to each other, such that, when the charts are optically fused, the common ground areas will appear as one.

6. Apparatus as defined in claim 5, wherein said common ground areas on said charts have substantially the same color and shade intensity, as said complementary indicia.

7. Apparatus for diagnosing and correcting eye fusion, comprising,
   a. a set of two charts adapted to be mounted in side-by-side relation for viewing,
   b. both of said charts having
      1. background areas of one color, and
      2. indicia thereon of the same color but of different shade intensity from that of the said background areas,
   c. the indicia on one chart being
      1. identical in form, size and shape with corresponding ones on the other of said charts and
      2. located thereon in positions relative to each other, such, that, when the charts are optically fused together by viewing through a variable prism of predetermined angularity or through a telebinocular, or reflective mirror instrument, by one having binocular vision, the corresponding identical indicia on the two charts will appear as one.

8. Apparatus as defined in claim 7, wherein each of said charts also contains indicia complementary to corresponding indicia on the other chart in the form, shape and size thereof, and located on said charts in positions relative to each other, such that, when the charts are optically fused, the corresponding identical indicia will appear as one.

9. The method of diagnosing eye fusion which comprises the steps of
   a. mounting a pair of charts in side-by-side relation at a predetermined distance from the viewer wherein said charts each has a common background area of one color and indicia thereon of the same color but of a different shade intensity,
   b. viewing said charts through a variable prism lens
   c. turning said lens until the two charts fuse together and form a cycloptic picture, and then
   d. determining whether eye suppression or binocularity is present in the viewer depending upon the viewer's ability to see the indicia on either or both charts in the cycloptic picture.

10. The method of diagnosing eye fusion which comprises the steps of
    a. mounting a pair of charts in side-by-side relation in an instrument capable of producing a cycloptic picture of said charts, wherein said charts each has a common background area of one color and indicia thereon of the same color but of different shade intensity,
    b. viewing said charts through said instrument, whereby the two charts will be seen as fused together forming a cycloptic picture, and then
    c. determining whether eye suppression or binocularity is present in the viewer depending upon the viewer's ability to see the indicia on either or both charts in the cycloptic picture.

11. The method of treating for the correction of eye fusion which comprises the steps of a. mounting a pair of charts in side-by-side relation at a predetermined distance from the viewer, wherein said charts each has a background area of one color and indicia thereon of the same color but of different shade intensity, b. viewing said charts through a variable prism lens, c. turning said lens until the two charts fuse together and form a cycloptic picture, d. viewing said cycloptic picture for a predetermined time period several times per day and e. increasing the length of said time periods progressively until binocularity has been achieved.

12. The method of treating for the correction of eye fusion in other than the central field of vision which comprises the steps of a. mounting a pair of charts in side-by-side relation at a predetermined distance from the viewer, wherein said charts each has a background area of one color and indicia thereon of the same color but of a different shade intensity, b. viewing said charts through a variable prism lens, c. turning the head in one direction to approximately 30° from straight forward and turning eyes in the opposite direction while viewing the charts, d. turning said lens until the two charts fuse together and form a cycloptic picture, e. viewing the charts through the prism with the head and eyes thus turned for a predetermined time period several times a day, and f. increasing said time periods until binocularity has been achieved.

\* \* \* \* \*

UNITED STATES PATENT OFFICE
CERTIFICATE OF CORRECTION

Patent No. 3,844,641　　　　　Dated October 29, 1974

Inventor(s)　　　Chester J. Nowak

It is certified that error appears in the above-identified patent and that said Letters Patent are hereby corrected as shown below:

Column 3, Line 28-

"phoropter" should be-- refractometer--

Signed and sealed this 4th day of March 1975.

(SEAL)
Attest:

RUTH C. MASON
Attesting Officer

C. MARSHALL DANN
Commissioner of Patents
and Trademarks